Figure 2A:
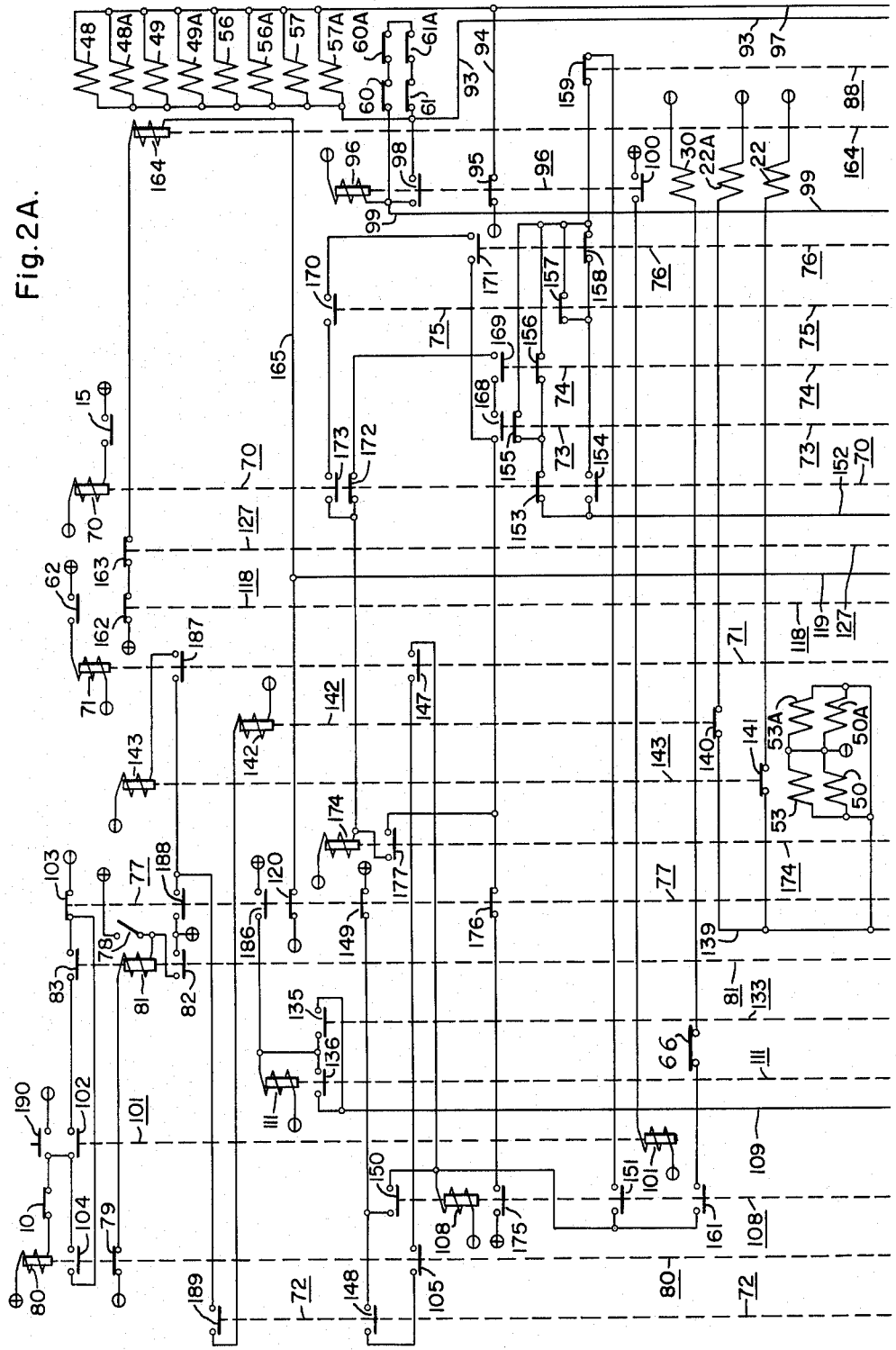

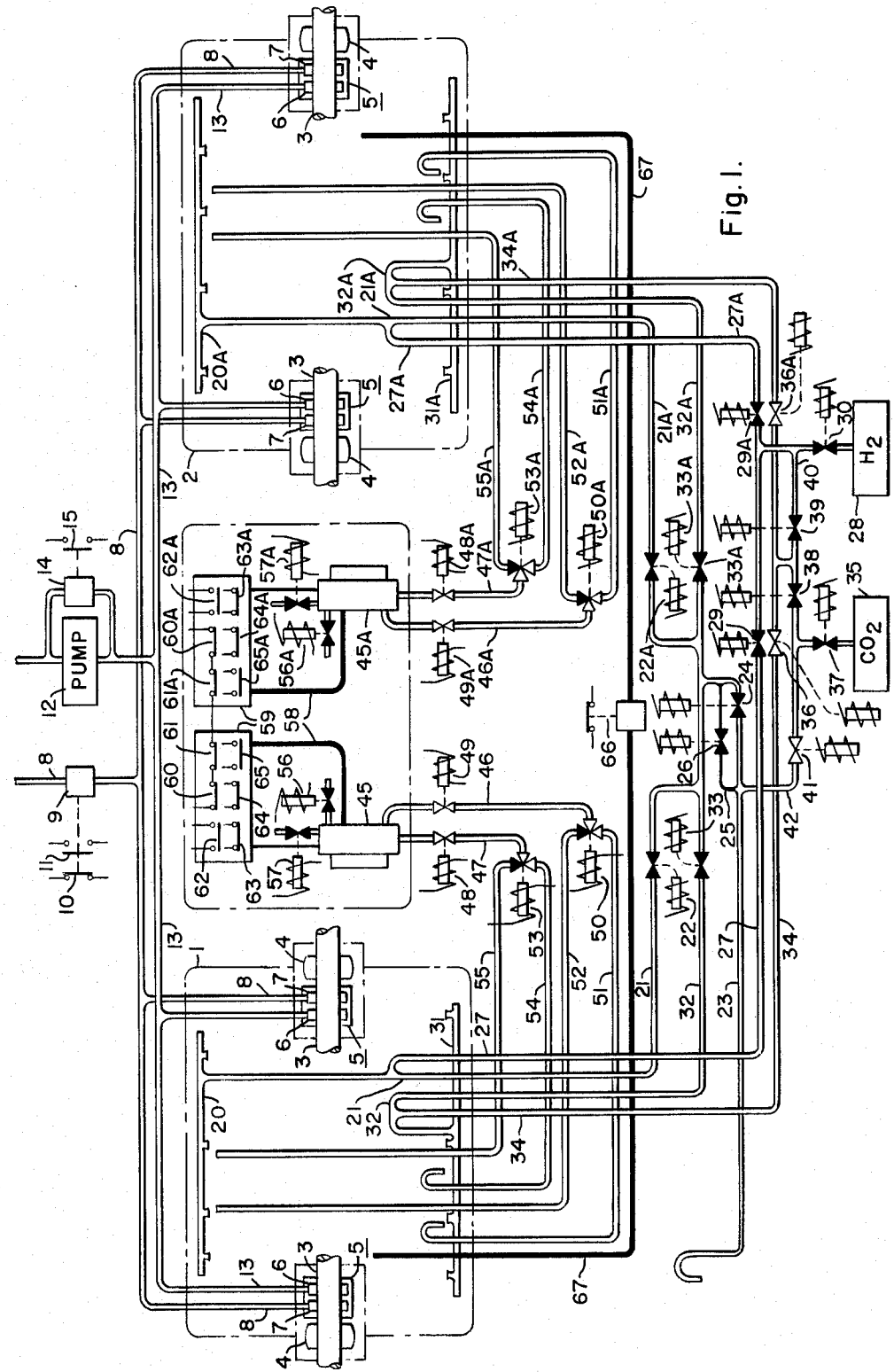

United States Patent Office 3,258,619
Patented June 28, 1966

3,258,619
GAS CONTROL SYSTEM FOR DYNAMO-ELECTRIC MACHINES
John D. Davidson, North Huntingdon Township, Westmoreland County, Pa., assignor to Westinghouse Electric Corporation, Pittsburgh, Pa., a corporation of Pennsylvania
Filed Feb. 21, 1963, Ser. No. 260,120
20 Claims. (Cl. 310—56)

The present invention relates to gas control systems for dynamoelectric machines, and more particularly to a completely automatic system for controlling the coolant gas of hydrogen cooled dynamoelectric machines such as turbine generators.

Dynamoelectric machines are cooled by circulation of a coolant gas through the machine and, in particular, turbine generators and some other large machines are usually cooled by means of hydrogen. These machines have a gas-tight housing and the hydrogen is circulated within the housing over and through the windings and other parts of the machine, to absorb heat from them, and then through coolers built into the housing which remove the heat from the gas.

Hydrogen is the most suitable coolant for these machines and is universally used for cooling turbine generators of large size, but it has the disadvantage of forming explosive mixtures with air so that it must be handled with great care and prevented from becoming mixed with air in sufficient concentration to be dangerous. For this reason, in filling a machine with hydrogen either initially or after a shutdown, it is necessary to first purge the machine of air before admitting the hydrogen. This is usually done by filling the machine with an inert purging gas which displaces the air and fills the machine, after which hydrogen can safely be admitted to the machine to replace the purging gas. Carbon dioxide is usually used for this purpose because of its ready availability and relatively low cost. These operations of purging the machine with carbon dioxide and then filling with hydrogen have heretofore usually been done by manual operation of the necessary valves to first admit carbon dioxide until its concentration in the machine reaches the desired level and then to shut off the carbon dioxide and admit hydrogen to the desired concentration and pressure.

During operation of the machine it is also necessary to control the gas to maintain the desired conditions. Thus, the purity of hydrogen in the machine must be continuously monitored to keep the desired hydrogen concentration, and to take immediate corrective action if the purity of hydrogen should fall to a level indicating that an incipiently dangerous condition may be approached. It is also necessary to maintain the desired hydrogen pressure in the machine, since the output obtainable is a function of the hydrogen pressure, and if the pressure is permitted to fall below the desired value the machine may become overheated when delivering its rated output. The ratings, or output capabilities, of large turbine generators are usually based on a specified hydrogen pressure in the machine and it is essential that the correct pressure be maintained during operation. The desired purity and pressure of the hydrogen are maintained by admitting additional hydrogen to the machine as required to make up the unavoidable loss of hydrogen, which may occur through the gland seals or otherwise. These operations of monitoring the hydrogen conditions in the machine and maintaining the desired conditions have heretofore been done either manually or in a semiautomatic manner under the supervision and control of an operator.

The principal object of the present invention is to provide a completely automatic gas control system for hydrogen cooled dynamoelectric machines which will automatically purge the machine of air, fill it with hydrogen to the desired purity and pressure, and maintain the purity and pressure of the hydrogen at the desired values during operation of the machine.

Another object of the invention is to provide an automatic gas control system for cross-compound turbine generator units which will automatically purge both machines of air by filling them with a purging gas to a desired concentration, fill both machines with hydrogen to the desired purity and pressure, and maintain the hydrogen purity and pressure at the desired values in both machines during operation.

A further object of the invention is to provide a gas control system for hydrogen cooled dynamoelectric machines which will maintain the desired hydrogen purity and pressure during normal operation, and which will automatically empty the machine of hydrogen and fill it with a purging gas if the hydrogen purity falls below a predetermined minimum value.

Still another object of the invention is to provide a gas control system for hydrogen cooled dynamoelectric machines using a double flow type of gland seals for the shaft which will permit operation at a somewhat reduced hydrogen purity if the flow of seal oil on the hydrogen side of the seals is interrupted, and which will automatically empty the machine of hydrogen and fill it with purging gas if the hydrogen purity falls below a lower predetermined value.

Still another object of the invention is to provide an automatic gas control system for hydrogen cooled dynamoelectric machines in which the operations of purging the machine of air and filling it with hydrogen are controlled by a purity meter which continuously monitors the purity of gas in the machine, and in which operation of the purity meter is automatically checked for correctness before purging and filling of the machine can proceed.

More specifically, the invention provides a gas control system for hydrogen cooled dynamoelectric machines which is shown applied to both machines of a cross-compound turbine generator unit, although in its broader aspects it is also suitable for use with a single machine. The system is controlled by a purity meter for each machine which continuously monitors the gas purity in its machine. In the operation of the system, which is completely automatic, the purity meters are first checked for correct operation before the further operation of the system is permitted to proceed. If both meters are operating correctly, vents are opened from the housings of both machines and carbon dioxide, or other suitable purging gas, is admitted to both machines to displace the air. When the desired concentration of carbon dioxide is reached in either machine, further flow of carbon dioxide to that machine is shut off, and when the second machine reaches the desired concentration the supply of carbon dioxide is shut off. With both machines filled with carbon dioxide and the vents still open, hydrogen is admitted to both machines to displace the carbon dioxide. When either machine has reached the desired purity of hydrogen, the flow of hydrogen to that machine is shut off and its vent closed, and when the other machine reaches the desired hydrogen purity its vent is also closed. Hydrogen is then admitted to both machines until the desired pressure is reached and the flow of hydrogen is then shut off.

During normal operation the system maintains the desired gas pressure by admitting additional hydrogen as needed. If the hydrogen purity in either machine falls below the desired value, hydrogen is admitted to that machine only and a restricted vent is opened to permit escape of a limited amount of gas from the housing.

When the hydrogen is brought back up to the desired purity, the vent is again closed and the flow of hydrogen shut off. If the hydrogen purity should fall below a predetermined safe minimum value in either machine, indicating the possibility that an incipiently dangerous condition may be approached if corrective action is not taken, the system operates automatically to open the vents of both machines and to admit carbon dioxide to purge both machines of hydrogen. The system also permits operation at a somewhat reduced level of hydrogen purity, above the minimum safe level, in case the flow of seal oil on the hydrogen side of a double flow gland seal is interrupted, so that the machine can continue to operate under this condition if necessary.

Figure 2B:
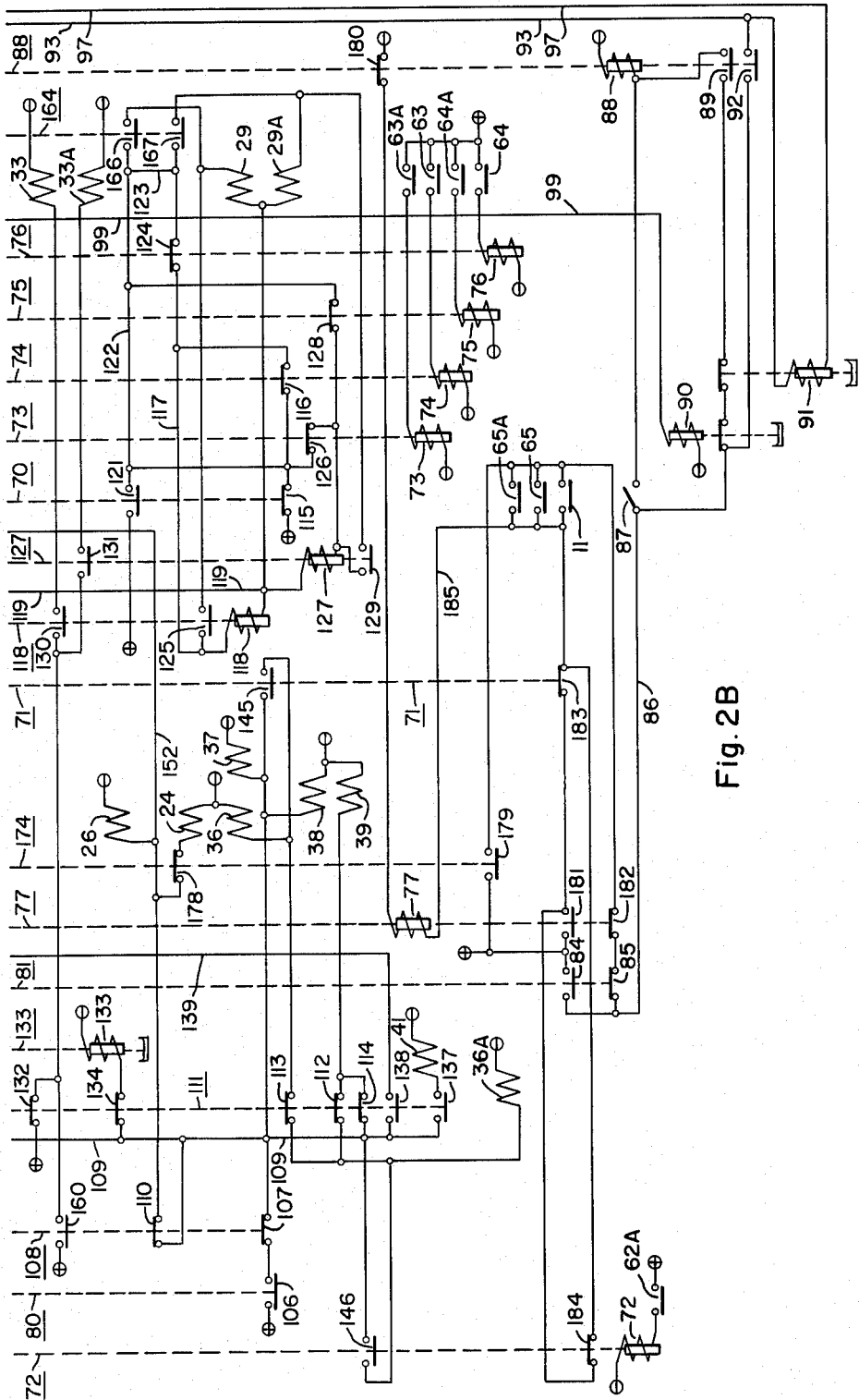

The invention will be more fully understood from the following detailed description of a preferred embodiment, taken in connection with the accompanying drawings, in which:

FIGURE 1 is a schematic diagram showing the gas piping and valves for controlling the gas flow in a cross-compound turbine generator unit; and FIGS. 2A and 2B, taken together, show a control circuit for controlling the operation of the various valves to obtain the desired gas flow and sequence of operations.

The invention is shown in FIGURE 1 embodied in a gas control system for the two machines 1 and 2 of a cross-compound turbine generator unit. It will be understood that in such a unit each machine is driven by its own turbine, with steam exhausting from a high pressure turbine which drives one machine to a low pressure turbine driving the other machine, although other arrangements of the turbines are possible and are sometimes used. The two machines 1 and 2 are usually of the same rating, and may be identical, and they are normally electrically connected in parallel to operate as a unit. The machines 1 and 2 may be any desired type of hydrogen cooled generators and their construction has not been shown in the drawings since it is not a part of the invention. A typical construction for such machines is shown, for example, in Baudry et al. Patent No. 2,707,243.

Each machine has a shaft 3 which is supported in bearings 4 at each end of the machine and gland seals 5 are provided to seal the gas-tight housings at the points where the shafts 3 pass through them. The gland seals 5 are shown diagrammatically as being of a type usually used in turbine generators. In this type of gland seal, the seals consist of rings surrounding the shaft with a very small clearance, and oil is fed through each ring to an annular space around the shaft from which it flows in both directions between the ring and the shaft, the pressure of the oil being maintained at a higher level than the pressure of the gas in the machine.

In the embodiment of the invention shown in the drawing, double flow gland seals of this type are utilized. Thus, as shown diagrammatically, each gland seal may consist of a hydrogen side seal ring 6 and an air side seal ring 7. In actual practice, a single seal ring with two oil passages may be used, but separate rings have been shown for clarity of illustration. Any suitable seal oil system may be utilized for supplying oil separately to each side of the gland seals. As shown diagrammatically, for the purpose of illustration, the air side seal oil may be supplied from any suitable source through piping 8 which supplies oil to the air side seal rings 7 of all four gland seals. A pressure switch 9 is provided to respond to the pressure of the air side seal oil. As previously indicated, the pressure of this oil is maintained at a value higher by a predetermined amount than the pressure of the hydrogen in the machines 1 and 2. It is essential that this differential pressure be maintained during operation of the machine, and the pressure switch 9 is provided to indicate loss of the differential pressure. For this purpose, the switch 9 has a normally closed contact 10 and a normally open contact 11. If the seal oil differential pressure falls below the desired value, which may for example be four pounds per square inch above the gas pressure in the machine, the pressure switch 9 operates to open the contact 10 and close the contact 11. These contacts are connected in the control circuit in a manner to be described hereinafter to prevent operation of the machine, or to effect purging of the machine of hydrogen, if the seal oil pressure is lost.

The hydrogen side seal rings 6 are supplied with seal oil from any suitable source, shown as a pump 12, which supplies oil to all four seal rings 6 through suitable piping 13. A pressure switch 14 is connected across the pump 12 to respond to the differential pressure across the pump so as to give an indication that the pump is operating normally and supplying seal oil to the hydrogen side seal rings 6. The pressure switch 14 has a contact 15 which is normally closed when the pump 12 is operating, and which opens if the pressure across the pump 12 falls below a predetermined value.

Gas is admitted to the machines 1 and 2, and vented from them, through piping illustrated in FIG. 1, and the flow of gas is controlled by solenoid-operated valves. Certain of these valves, shown shaded in the drawing, are normally closed, that is, the valve is closed when its solenoid is not energized and opens when the solenoid is energized; other valves, shown unshaded in the drawing, are normally open and close when the operating solenoid is energized. For convenience, the same reference numeral will be used to designate both the valve itself and its solenoid. The valves are operated in the desired sequence by energizing and deenergizing their solenoids by means of a control system illustrated in FIGS. 2A and 2B, which will be described later.

Each of the machines 1 and 2 has a top gas manifold 20 and 20A, respectively, disposed in the upper part of the gas-tight housing of the machine and arranged for gas to flow into or out of the housing through the manifold. The top manifolds 20 and 20A are connected by pipes 21 and 21A, respectively, through normally closed solenoid valves 22 and 22A, to a common vent pipe 23 which is controlled by a normally closed solenoid valve 24. A restricted vent 25 is also provided, which may be a pipe of relatively small size to permit escape of a limited amount of gas, and which is connected as shown to by-pass the valve 24. The restricted vent 25 is controlled by a normally closed solenoid valve 26. The vent pipe 23 extends to the outside of the building in which the machines 1 and 2 are located, or to any suitable location where hydrogen can safely be discharged. The top manifolds 20 and 20A are also connected by pipes 27 and 27A to a suitable supply of hydrogen indicated at 28. Each of the hydrogen supply pipes 27 and 27A has a normally closed solenoid valve 29 and 29A, respectively, to control the flow of hydrogen to the respective machines, and a solenoid valve 30 controls the flow of gas from the hydrogen supply 28.

Each of the machines 1 and 2 also has a bottom gas manifold 31 and 31A, respectively, disposed near the bottom of the gas-tight housing and arranged to permit gas to flow into or out of the housing through the manifold. The manifolds 31 and 31A are connected by pipes 32 and 32A, respectively, to the common vent pipe 23 through normally closed solenoid valves 33 and 33A. The bottom gas manifolds 31 and 31A are also connected through pipes 34 and 34A, respectively, to a carbon dioxide supply indicated at 35. Normally open solenoid valves 36 and 36A are provided in the pipes 34 and 34A to control the flow of carbon dioxide to the respective machines, and a normally closed solenoid valve 37 is provided to control the flow of gas from the carbon dioxide supply. A second normally closed solenoid valve 38 is also provided between the carbon dioxide supply and the carbon dioxide feed lines 34. The carbon dioxide supply 35 is also connected through a normally closed valve 39 and a pipe 40 to the hydrogen feed lines, as shown, and is connected through a normally open valve 41 and pipe 42 to the vent pipe 23. It will be understood that any suitable purging gas may be used which is inert with respect to both air and hydrogen, although carbon dioxide is the most suitable and usually used gas for this purpose.

The operation of the control system is controlled by purity meters 45 and 45A which continuously monitor the gas purity in the machines 1 and 2. The purity meters may be of any suitable type which is capable of continuously monitoring the gas purity and giving an output representative of the gas concentration in the machines. In the preferred embodiment shown in the drawings, the purity meters 45 and 45A are of a well known type generally used for measuring the gas purity in hydrogen cooled turbine generators. These meters consist essentially of a small blower driven at constant speed with means for measuring the differential pressure across the blower. The differential pressure produced by a blower running at constant speed is a function of the density of the gas, and if the composition of the gas is known, the differential pressure across the blower indicates the purity or concentration of a particular gas in the sample passing through the blower. In use, the gas in the machine housing is continuously sampled and a small sample of the gas is circulated through the purity meter. The output pressure of the purity meter then gives a direct indication of the gas purity. Since the gas pressure in the housing changes, the purity meters are compensated in a well known manner to provide constant input pressure, and the output pressure of the purity meters is then a direct indication of the composition of a mixture of known gases in the machine.

The meters 45 and 45A may be of this type and are shown diagrammatically as blowers connected to the respective machines through sampling lines. Thus, gas flows to the intake sides of the purity meters through sampling lines or pipes 46 and 46A and returns from the discharge sides of the purity meters to the respective machines through lines 47 and 47A. Normally open solenoid valves 48 and 48A, and 49 and 49A, are provided in the sampling lines to shut the purity meters off from the machines when desired. The sampling lines 46 and 46A are connected to the machines through three-way solenoid valves 50 and 50A. Each of these valves in its deenergized position connects the corresponding sampling line through a pipe 51 or 51A to the lower portion of the housing 1 or 2 to take the gas sample from the bottom of the housing. In the energized positions of the valves 50 and 50A, the sampling lines 46 and 46A are connected to the upper part of the housings 1 and 2 through pipes 52 and 52A to take the gas sample from the top of the housing. The return sampling lines 47 and 47A are connected to the housings through similar three-way valves 53 and 53A, respectively. In the deenergized positions of the valves 53 and 53A, the lines 47 and 47A are connected to the lower part of the housings 1 and 2 through pipes 54 and 54A, while in the energized positions of the valves 53 and 53A, the lines 47 and 47A are connected to the upper portions of the housings 1 and 2 through pipes 55 and 55A. Thus, by operation of the three-way valves, the purity meters 45 and 45A can be connected to sample the gas either from the upper portions of the housings 1 and 2 or from the lower portions of the housings.

For checking the calibration and operation of the purity meters it is desirable to operate them with pure air passing through the meters, and for this purpose the meters are provided with normally closed solenoid valves 56 and 56A for opening the intake sides of the meters directly to the surrounding air, and normally closed solenoid valves 57 and 57A for opening the discharge sides of the meters directly to the air. It will be seen that by opening these valves and closing the valves 48 and 48A, and 49 and 49A, the meters can be operated with atmospheric air to check their operation by observing the output pressure under this known condition.

As previously indicated, the control system for operating the various valves is controlled by the purity meters. The output pressure of the purity meters is a measure of the gas purity in the machine, and for the purposes of the present invention, the output pressure of each purity meter is used to operate a series of pressure switches to control the operation of the control system in the manner to be described hereinafter. For this purpose, the output pressure of each purity meter is applied through lines 58 to control devices 59 of any suitable type, each of which incorporates six pressure switches which respond to the output pressure of the purity meter. For checking purposes, each of the control devices 59 has two pressure switches 60 and 61, and 60A and 61A, respectively. These switches are adjusted to be closed when air is passing through the purity meter and its indication is correct for this condition. All four of these switches are connected together in series, as shown, to indicate proper operation of both purity meters. The output pressure of the purity meter varies with the density of the gas and will be highest when the gas density in the corresponding machine is the highest. This condition will occur when the machine is filled with carbon dioxide, and as the carbon dioxide is replaced with hydrogen the output pressure of the purity meter will decrease. The various pressure switches are arranged to open and close in sequence as the output pressure decreases. Each of the control devices 59 has a pressure switch 62 or 62A which is normally open and closes when the concentration of carbon dioxide in the machine reaches the desired maximum value. Pressure switches 63 and 63A are normally open switches and close when the purity meter output pressures fall to a value indicating a predetermined hydrogen concentration, and switches 64 and 64A are similar and close when the purity meter pressures reach a lower value indicating a higher predetermined hydrogen concentration which is the desired normal operating condition. Pressure switches 65 and 65A are normally closed switches which are open at low purity meter output pressures and close when the output pressure is above a value indicating a minimum desired hydrogen concentration. The following table indicates the operation of the six pressure switches associated with each purity meter as the output pressure of the meter rises or falls above or below the values indicated, the particular pressures being illustrative of typical pressures obtained with this type of purity meter and the corresponding gas concentrations being preferred values used in typical turbine generators.

| Switch | Operation | Purity Meter Output Pressure, p.s.i.g. | Condition |
|---|---|---|---|
| 62, 62A | Close | >26.5 | 95% $CO_2$. |
| 60, 60A | Open | >19.0 | 100% Air. |
| 61, 61A | Open | <18.4 | 100% Air. |
| 65, 65A | Open | <6.27 | 85% $H_2$. |
| 63, 63A | Close | <5.55 | 90% $H_2$. |
| 64, 64A | Close | <4.82 | 95% $H_2$. |

A particular type of purity meter has been described for the purpose of illustration, but it will be understood that any suitable type of meter might be used which is capable of continuously monitoring the gas purity and providing an output which can be used to operate a series of control switches in the manner described.

Another pressure switch 66 is provided to respond to the gas pressure in the machines 1 and 2. As will appear later, the machines are connected during normal operation so that the pressure is the same in both machines, and the pressure switch 66 may be connected to the housing of either machine, or if desired it may be connected to both machines by sensing lines 67. The pressure switch 66 is normally closed and opens its contact when a predetermined pressure is reached.

Operation of the various solenoid valves to control the flow of gas is effected by the control system shown in FIGS. 2A and 2B. This system includes a number of relays which are controlled by the pressure switches described above and which are shown in their deenergized positions. A relay 70 is provided to permit operation at somewhat reduced hydrogen purity if the hydrogen side seal oil pressure is lost. The relay 70 is controlled by the pressure switch 14 which is actuated by the pressure across the hydrogen side seal oil pump 12. When the pump is providing seal oil at normal pressure to the gland seal rings 6 the contacts 15 are closed and the relay 70 is energized. If the pump 12 is not operating, or if the seal oil pressure is otherwise lost, the relay 70 is deenergized with its contacts in the position shown in the drawing. This permits operation of the machine at reduced hydrogen purity until the oil pressure can be restored. This of course is not a normal or desirable operating condition but it is permissible for a limited time until the trouble can be corrected. The relay 70 permits such operation and the reduced hydrogen purity prevents the excessive consumption of hydrogen that would occur if it were attempted to maintain the normal purity under these conditions.

Relays 71 and 72 are controlled by the pressure switches 62 and 62A, respectively. As previously indicated, these switches are normally open and close when the respective purity meters indicate that the carbon dioxide concentration in the respective machines has reached the desired value. The relays 71 and 72 are energized by closure of the pressure switches. Relays 73 and 74 are controlled by the pressure switches 63 and 63A, respectively, which close when the hydrogen purity in the corresponding machines reaches 90%, for example. These relays thus are energized when the predetermined gas purity is reached. These two relays are effective to control the hydrogen flow when the relay 70 is deenergized, indicating loss of hydrogen side seal oil pressure. Relays 75 and 76 are controlled by the pressure switches 64 and 64A, respectively. These switches close when the hydrogen purity in their respective machines reaches 95%, for example, which is the normal operating condition. The relays 75 and 76 are effective to control the hydrogen flow when the relay 70 is energized, and they are energized when the pressure switches close.

A purge relay 77 is also provided to effect purging of the machines if the purity of the hydrogen falls below a predetermined minimum safe value during operation. This relay is normally deenergized but is energized by operation of either of the pressure switches 65 and 65A, which close when the hydrogen purity is below the desired minimum, or by operation of the pressure switch 11 which closes if the air side seal oil pressure is lost. A number of additional control relays are also provided, as shown in the drawing, the operation and functions of which will become apparent as the description proceeds.

The arrangement and operation of the control system can best be understood by describing its operation as it goes through a complete cycle of filling the machines 1 and 2 with hydrogen and of controlling the gas pressure and purity during operation of the machines.

If it is assumed that the machines 1 and 2 are filled with air and are to be started and put into normal operation, the gland seals 5 are supplied with oil through the piping 8 and 13, as previously described, and the machines may be rotating at low speed. The pressure switch contact 10 will be closed when the proper air side seal oil pressure exists, and if the hydrogen side seal oil is being supplied at its normal pressure, the pressure switch contact 15 will be closed to energize the relay 70. Operation of the gas control system is then initiated by momentarily closing a switch 78. This may be done manually, or it may be done automatically in response to a signal from a computer, or other control device, as part of a complete automatic starting sequence for the machines.

Closure of the switch 78 completes a circuit through a normally closed contact 79 of a relay 80 to energize a relay 81. When the relay 81 is energized, it closes a contact 82 which completes a holding circuit for the relay 81 so that the switch 78 can be released. A contact 83 in the energizing circuit of the relay 80 also closes. The relay 81 also closes a contact 84 (FIG. 2B) to initiate a checking cycle to check the operation of the purity meters 45 and 45A, and opens an interlock contact 85 which prevents energization of the purge relay 77.

The checking cycle for the purity meters is a necessary pre-requisite to the further operation of the control system. This checking cycle is initiated by closure of the relay contact 84 which completes an energizing circuit through a conductor 86 to a switch 87. The switch 87 may be closed by another signal from a computer, or may be manually closed, and when the switch 87 is closed a circuit is completed for energizing a relay 88.

When the relay 88 is energized, it closes a contact 89 which completes a holding circuit for the relay 88 through the normally closed contacts of a first time delay relay 90 and a second time delay relay 91. The relay 88 also closes a contact 92 which completes an energizing circuit from the conductor 86 through a conductor 93 to the solenoid valves 48, 48A, 49, 49A, 56, 56A, 57 and 57A, all in parallel, the circuit being completed through a conductor 94 and a normally closed contact 95 of a relay 96. The relay contact 92 also completes an energizing circuit for the time delay relay 91 from the conductor 86 and through a conductor 97 to the conductor 94. The time delay relay 91 may be set for any suitable delay period, such as thirty seconds, and will open its contact at the end of that period.

Energization of the solenoid valves mentioned above causes the valves 48, 48A, 49 and 49A to close and the valves 56, 56A, 57 and 57A to open. As previously explained, this shuts off the purity meters 45 and 45A from the machines 1 and 2 and opens them to the surrounding air. In a typical purity meter of the type described, the output pressure of the purity meter when operating in pure air may be approximately 18.7 pounds per square inch. Accordingly, the pressure switches 60 and 60A are set to open if the purity meter output pressure exceeds 19.0 pounds per square inch, and the pressure switches 61 and 61A are set to close when the output pressure exceeds 18.4 pounds per square inch. Thus, if the purity meters are operating properly, all four of these pressure switches will be closed. If one or more of the pressure switches fails to close within the time delay period of the relay 91, the relay opens its contact and deenergizes the relay 88, which prevents further operation of the control system. If desired a suitable alarm or signal may be provided to indicate this condition.

If all four of the pressure switches close within the delay period of relay 91, however, a circuit is completed from the conductor 93 through the four pressure switches in series to energize the relay 96. The relay 96 then closes its holding contact 98 to maintain its energization directly from conductor 93, and opens the contact 95 to deenergize the solenoid valves, permitting them to return to their normal positions. The time delay relay 91 is also deenergized by opening of the contact 95 so that it does not open its contact. Closure of the contact 98 also completes a circuit from conductor 93 through a conductor 99 to energize the time delay relay 90, which may be set for a shorter period such as ten seconds. The relay 96 also closes a contact 100 which completes an energizing circuit for a relay 101. The time delay relay 90 opens its contact at the end of its delay period which is made long enough for the relay 101 to operate and for the purity meter outputs to return to normal. When the relay 90 opens its contact, it deenergizes the relay 88 which drops out to deenergize the relay 96. This completes the checking cycle for the purity meters which insures that the calibrations and operation of the meters are correct before filling of the machines 1 and 2 with hydrogen can proceed. If the purity meters are properly operating, the checking cycle is completed by energizing the relay 101 which initiates the further operation of the control system.

When the relay 101 is energized it closes its contact 102 to complete a circuit for energizing the relay 80. This circuit extends through a normally closed contact 103 of the purge relay 77, contact 83 of relay 81 which is still energized at this time, the contact 102 and the pressure switch contact 10 to the relay 80. The relay 80 upon energization closes a sealing contact 104 to hold itself in through a circuit which includes the pressure switch contact 10, the contact 104 and the contact 103 of relay 77. It will be noted that the relay 101 is deenergized when the relay 96 drops out, but the relay 80 has sufficient time to close its contacts and complete its holding circuit before this occurs. When the relay 80 is energized, it also opens the contact 79 to deenergize relay 81, and closes the contacts 105 and 106.

Energization of the relay 80 initiates the operation of purging the machines 1 and 2 with carbon dioxide. When the relay contact 106 closes, en energizing circuit is completed through a normally closed contact 107 of a relay 108 to the solenoid valves 37 and 38 to open these valves. At the same time, a circuit is completed through conductor 109 and contact 110 of the relay 108 to the solenoid valves 24 and 26, causing these valves to open. A circuit is also completed from conductor 109 through closed contact 114 of a relay 111 to solenoid valve 39 causing it to open. Circuits are also completed through contacts 114, 112 and 113 of relay 111 to solenoid valve 36, and through relay contacts 114 and 112 to solenoid valve 36A. These two normally open valves are thus closed.

Circuits have also been established at this time through the contacts of the relay 70 for energizing the solenoid valves 29 and 29A. If the relay 70 is in its deenergized position shown in the drawing, a circuit extends through the contact 115 of relay 70, closed contact 116 of relay 74 and a conductor 117 to a relay 118. The energizing circuit for relay 118 is completed through a conductor 119 and a normally closed contact 120 (FIG. 2A) of relay 77. If the relay 70 is in its energized position, which is the normal condition as previously described, the energizing circuit for relay 118 extends through contact 121 (FIG. 2B) of relay 70, conductor 122, conductor 123, closed contact 124 of relay 76 and conductor 117 to relay 118. Thus, the relay 118 is energized in either position of the relay 70, when the relays 74 and 76 are deenergized. When relay 118 is energized, it closes its contact 125 which completes either of two circuits, one circuit extending through contact 121, conductor 122, conductor 123 and contact 124 to conductor 117, and the other extending through contact 115 and contact 116 to conductor 117, both circuits then extending through a relay contact 125 and solenoid valve 29 to conductor 119. The valve 29 is thus energized and opened.

At the same time, if the relay 70 is in its deenergized position, another circuit is completed through relay contact 115 and a normally closed contact 126 of relay 73 to a relay 127, the energizing circuit of relay 127 being completed through conductor 119. If the relay 70 is in its energized position, there is a circuit through contact 121, conductor 122, and contact 128 of relay 75 to relay 127. Thus, in either position of the relay 70, the relay 127 is energized and closes its contact 129, if the relays 73 and 75 are deenergized. A circuit is then completed either through relay contacts 115, 126 and 129 to solenoid valve 29A, or through relay contact 121, conductor 122, relay contact 128 and contact 129 to solenoid valve 29A. Thus, in either position of the relay 70, if the relays 73, 74, 75 and 76 are deenergized, the relays 118 and 127 are energized and effect energization of solenoid valves 29 and 29A to open them.

When relays 118 and 127 are energized, they also close their contacts 130 and 131, respectively, which complete energizing circuits through a normally closed contact 132 of relay 111 to the solenoid valves 33 and 33A to open those valves.

Referring now to FIG. 1, it will be seen that at this time the valves 37 and 38 are open and permit carbon dioxide to flow from the supply 35. The normally open valves 36 and 36A are closed, however, to prevent carbon dioxide from flowing into the machines 1 and 2. Valve 39 is open to permit carbon dioxide to flow through the pipe 40 into the hydrogen feed lines 27 and 27A, through the now open valves 29 and 29A, to purge these lines of air. The normally open valve 41 is open at this time and permits carbon dioxide to flow through the pipe 42 to the vent pipe 23 to purge the air from the vent. The vent valves 24 and 26 are also open and the valves 33 and 33A are open to permit the vent lines 32 and 32A to be purged.

When the relay 80 closes its contact 106 to initiate the operations just described, a time delay relay 133 is also energized from conductor 109 through a normally closed contact 134 of relay 111. The time delay relay 133 is adjusted for a time delay sufficient to permit the carbon dioxide to purge the vent lines and hydrogen feed lines of air, which may be of the order of one minute, and after this time has elapsed, the relay 133 closes its contact 135 (FIG. 2A). This completes a circuit for energizing the relay 111 from the conductor 109, and the relay 111 is energized and closes a sealing contact 136 to hold itself in directly from the conductor 109.

When the relay 111 is energized, it opens its contacts 132 and 134 which deenergize and close the solenoid valves 33 and 33A and deenergizes the time delay relay 133. At the same time, relay contact 113 opens and deenergizes the solenoid valve 36, and relay contacts 114 and 112 also open to deenergize solenoid valves 36A and 39. Valves 36 and 36A therefore open and valve 39 closes. At the same time, relay contact 137 closes to energize and close solenoid valve 41, and relay contact 138 closes to complete circuits from conductor 109 through conductor 139 and normally closed contacts 140 and 141 of relays 142 and 143 to the solenoid valves 22 and 22A to energize and open those valves. The three-way solenoid valves 50, 50A, 53 and 53A are also energized from conductor 139, so that these valves operate to connect the purity meters to the sampling lines 52 and 55, and 52A and 55A, respectively, to sample the gas at the upper part of the respective machine housings. The vent valves 24 and 26 and the carbon dioxide feed valves 37 and 38 remain energized at this time.

Since the valves 36 and 36A are now open, carbon dioxide flows into machines 1 and 2 through the pipes 34 and 34A and the bottom gas manifolds 31 and 31A. The top gas manifolds 20 and 20A are connected through the pipes 21 and 21A and the valves 22 and 22A to the vent line 23. Carbon dioxide thus flows into the machine housings through the bottom gas manifolds and displaces the air in the housings which escapes through the top gas manifolds to the vent. As previously indicated, the purity meters 45 and 45A sample the gas at the upper part of the housings at this time and thus monitor the concentration of carbon dioxide adjacent the gas exit.

The two machine housings 1 and 2 are purged of air in this way until the desired concentration of carbon dioxide in the housings is reached, which may, for example, be 95% carbon dioxide. It will be understood that this point is not reached simultaneously in both machines, but one machine will usually attain the desired carbon dioxide concentration before the other. If, for example, the machine 1 first reaches the desired concentration, the pressure switch 62 will close when the output pressure of the purity meter 45 indicates the desired concentration, as previously explained. When the pressure switch 62 closes, the relay 71 is energized and closes its contact 145 (FIG. 2B) which completes a circuit from conductor 109 to the solenoid valve 36. This normally open valve is thus energized and closes to shut off further flow of carbon dioxide to the machine 1. At some later time when the machine 2 reaches the desired concentration of carbon dioxide, the pressure switch 62A closes and energizes relay 72. This relay then closes its contact 146 and completes a circuit from conductor 109 to solenoid valve 36A to energize that valve and close it to shut off the flow of carbon dioxide to the machine 2. It will be understood that the relays 71 and 72 may be energized in either order depending on which machine first reaches the desired carbon dioxide concentration.

When the relays 71 and 72 are energized, they also close their contacts 147 and 148 (FIG. 2A), respectively. When both relays are energized, these contacts complete an energizing circuit for the relay 108 extending from the relay coil through contact 147, closed contact 105 of relay 80, contact 148 and normally closed contact 149 of relay 77. The relay 108 seals itself in by closing a sealing contact 150.

When relay 108 is energized, it opens its contact 107 to deenergize the conductor 109 and relay 111, which drops out and opens its contacts 137 and 138. As a result, solenoid valves 36 and 36A are deenergized and reopen, valves 37, 38 and 39 are deenergized and close, valves 22 and 22A are deenergized and close, and three-way valves 50, 50A, 53 and 53A are deenergized and return to their position in which the purity meters are connected to the lower portions of the machine housings 1 and 2 through sampling lines 51, 51A, 54 and 54A. Contact 110 of relay 108 also opens, but energization of the vent valves 24 and 26 is maintained by closure of the contact 151 of relay 108. This energizing circuit extends from the valves 24 and 26 to conductor 152, through one or the other of contacts 153 and 154 of relay 70, and through either contacts 155 and 156 of relays 73 and 74 in parallel, or contacts 157 and 158 of relays 75 and 76 in parallel, closed interlock contact 159 of relay 88, and relay contact 151 to relay contact 150 and contact 149. The vent valves 24 and 26 are thus energized and remain open. Contact 160 of relay 108 also closes and energizes solenoid valves 33 and 33A through contacts 130 and 131 of relays 118 and 127 which are still energized. Contact 161 of relay 108 also closes and completes a circuit from contact 150 through closed pressure switch 66 to solenoid valve 30.

The supply of carbon dioxide has now been shut off by closure of the valves 37 and 38, and the hydrogen valve 30 is open to permit hydrogen to flow from the supply 28 through the valves 29 and 29A, which are still open, to the top gas manifolds 20 and 20A. The valves 33 and 33A are open to permit gas to escape through the bottom manifolds 31 and 31A and the pipes 32 and 32A to the vent 23. The purity meter sampling lines are connected through their respective valves to the lower part of the machine housings.

Hydrogen therefore flows into both machines through the top manifolds and displaces the carbon dioxide which escapes through the bottom manifolds to the vent. As the hydrogen displaces the carbon dioxide in the machines, the density of the gas decreases, and the output pressure of the purity meters correspondingly decreases. When the output pressure of the purity meters has decreased to a value indicating hydrogen purity of 90%, the pressure switches 63 and 63A close, and when the output pressure has further decreased to a value indicating a hydrogen purity of 95%, the pressure switches 64 and 64A close. Thus, the relays 73, 74, 75 and 76 are individually energized when predetermined hydrogen purities are reached in each machine. If the relay 70 is in its deenergized position, indicating absence of hydrogen side seal oil pressure, the relays 73 and 74 will be effective to control the operation, while if the relay 70 is energized indicating normal hydrogen side seal oil pressure, the relays 75 and 76 will control the operation.

If it is assumed that relay 70 is in its energized position, which is the normal condition, and that machine 1 first reaches 95% hydrogen purity, operation of the pressure switch 64 causes the relay 76 to open its contact 124 which interrupts the energizing circuit for solenoid valve 29, and for relay 118. Valve 29 closes to interrupt the flow of hydrogen to the machine 1, and relay 118 opens its contact 130 to deenergize valve 33 which closes to shut off the machine 1 from the vent. As soon as the second machine reaches the same hydrogen purity, operation of pressure switch 64A causes relay 75 to open its contact 128 which interrupts the energizing circuit of the solenoid valve 29A, and relay 127. Valve 29A thus closes and relay 127 is deenergized and opens its contact 131 to deenergize and close valve 33A. Both machines are now closed with the flow of hydrogen shut off and the vents closed. It will be apparent that if the relay 70 were in its deenergized position, operation of relays 73 and 74 by pressure switches 63 and 63A would effect the same valve operations by opening relay contacts 116 and 126. Operation of both relays 73 and 74, or of both relays 75 and 76, interrupts the circuit through conductor 152 to the vent valves 24 and 26, causing these valves to close.

Deenergization of relays 118 and 127 also causes them to close their contacts 162 and 163 (FIG. 2A), respectively. When both of these contacts are closed, an energizing circuit is completed for a relay 164 through conductor 165 and closed contact 120 of relay 77. Relay 164 is thus energized and closes its contacts 166 and 167 (FIG. 2B). Operation of both relays 73 and 74, or of both relays 75 and 76, also effects energization of a relay 174. The circuit for this relay extends from the relay coil through either contact 172 or 173 of relay 70 and either through contacts 170 and 171 in series of relays 75 and 76, or through contacts 168 and 169 in series of relays 73 and 74, closed contact 176 of relay 77 and closed contact 175 of relay 108. The relay 174 is thus energized and closes a sealing contact 177 to hold itself in. The relay 174 upon energization opens its contact 178 to interrupt the circuit of solenoid valve 24 and closes a contact 179 to set up an energizing circuit for the relay 77.

When relay 164 is energized and closes its contacts 166 and 167, energizing circuits are completed through one or the other of the relay contacts 115 or 121 of relay 70, through conductor 122 and relay contact 166 to solenoid valve 29, and through conductor 122, conductor 123 and relay contact 167 to solenoid valve 29A, the energizing circuits of these valves being completed through conductor 119. The valves 29 and 29A therefore reopen and again admit hydrogen to both machines.

Since the vent valves 24 and 26, and valves 33 and 33A are now closed, the hydrogen pressure in the machines will increase. The two machines are connected at this time through the lines 34 and 34A and the normally open valves 36 and 36A so that the pressure in the two machines is equalized. The pressure in the machines thus builds up to its desired value for operation of the machines at their rated output, which may, for example, be sixty pounds per square inch gauge or any other desired value. When the pressure reaches this value, the pressure switch 66 opens its contact and interrupts the energizing circuit of the valve 30 which closes and shuts off the flow of hydrogen to the machines. The generator unit is now in condition for normal operation, with both machines filled with hydrogen to the rated pressure and with the vents closed so that the machines are sealed. The unit can now be brought up to normal operating speed and connected to the line.

It will be understood that in normal operation there will be a small unavoidable loss of hydrogen through the gland seals, or otherwise. A small amount of air may also be carried into the machines in solution in the gland seal oil, or otherwise, so that the purity of the hydrogen is reduced. The loss of hydrogen results in decreased pressures which must be made up by admitting additional hydrogen. If the pressure falls below the desired value for which the pressure switch 66 is set, the switch 66 will close its contact. This re-establishes the energizing circuit for the solenoid valve 30 which opens to admit hydrogen through the valves 29 and 29A which remain open during operation. The pressure is thus brought back up to the desired value, and the pressure switch 66 then opens its contact and deenergizes the valve 30 to shut off the hydrogen. The desired pressure is thus maintained during operation.

If the purity of the hydrogen in either machine drops below the desired value, that is, below either 95% or 90% depending upon the position of the relay 70, the appropriate relay 73, 74, 75 or 76 will be deenergized by opening of the corresponding pressure switch. Thus, for example, if the relay 70 is in its energized position and the purity of the hydrogen in the machine 1 falls below 95%, the pressure switch 64 will open and deenergize the relay 76. The relay contact 124 closes to establish the energizing circuit for the relay 118, and relay contact 158 closes to re-establish the previously described energizing circuit through conductor 152 to the restricted vent valve 26, which opens. The main vent valve 24, however, is not energized because the contact 178 of relay 174 is now open. Energization of relay 118 closes its contact 130 to energize the valve 33 and open it to connect the machine 1 to the vent. At the same time, the relay 118 opens its contact 162 to deenergize the relay 164 which opens its contacts 166 and 167, interrupting the energizing circuits through these contacts to valves 29 and 29A. Valve 29A closes to shut off the machine 2 from the hydrogen supply, but valve 29 is now energized through contact 125 of relay 118, as previously described, and remains open.

Thus, the machine in which the purity has dropped is opened to the restricted vent with its hydrogen supply valve open, while the hydrogen supply valve and vent valves of the other machine are closed. Opening the restricted vent valve 26 results in the escape of hydrogen and a drop in pressure which causes the pressure switch 66 to close its contact and open the main hydrogen supply valve 30, so that pure hydrogen is admitted to the machine in which the purity has fallen while a limited amount of hydrogen escapes from the machine. In this way, by permitting escape of a limited amount of hydrogen while pure hydrogen is admitted, the purity is restored to its normal value, and when this occurs, the pressure switch 64 closes and energizes the relay 76. This opens the contacts 124 and 158 which results in closure of the vent valve 24 and deenergization of the relay 118. Relay 164 is energized, as previously described, and energizes both valves 29 and 29A. With both valves 29 and 29A open and the vent valves closed, the pressure in the machines can again build up to its desired value, and the pressure switch 66 then opens its contact to close the main hydrogen supply valve 30. The machines have then been restored to the normal operating condition.

It will be apparent that if the purity of hydrogen in the machine 2 had dropped, similar operation to restore the hydrogen purity would be effected by deenergization of the relay 75. Similarly, if the relay 70 were in its deenergized position, 90% hydrogen purity would be maintained by operation of the relays 73 and 74.

If for any reason the hydrogen purity in either machine falls below the desired value and cannot be brought back in the manner described above, the possibility of an incipiently dangerous condition exists, and the machines must be emptied of hydrogen immediately. If the purity in either machine falls below a predetermined safe minimum value, such as 85% hydrogen, for example, the pressure switch 65 or 65A associated with that machine closes. Similarly, if the air side seal oil pressure is lost, for any reason, the hydrogen pressure cannot be held by the seals and it is necessary to immediately purge the machine. The pressure switch 9 responds to the seal oil pressure and closes its contact 11 if the differential pressure above the hydrogen pressure falls below a predetermined amount.

Closure of any one of the three pressure switches 11, 65 or 65A completes an energizing circuit for the purge relay 77. This circuit extends through the closed contact 179 of relay 174, through one of the pressure switches 11, 65 or 65A, conductor 185, relay 77, and closed interlock contact 180 of relay 88. The purge relay 77 is thus energized and closes its contact 181 and opens the contact 182. Closure of the contact 181 completes a holding circuit for the relay 77 extending from the contact 181 through either contact 183 of relay 71 or contact 184 of relay 72, and conductor 185 to the relay 77. It will be understood that the relays 71 and 72 are deenergized during normal operation of the machine, and the contacts 183 and 184 are therefore closed so that the relay 77 is held in.

When the relay 77 is energized, it also opens its contact 103 to deenergize relay 80, and closes its contact 186 to energize the relay 111. At the same time, relay contact 120 opens to deenergize relay 164 and to interrupt the circuit of conductor 119 so that the relays 118 and 127 are deenergized. The valves 29 and 29A are thus deenergized, since the relay contacts 125, 129, 166 and 167 are all open, and the valves close to shut off the hydrogen from the machines 1 and 2. Contact 149 of relay 77 also opens to deenergize relay 108, which opens its contact 161 to interrupt the energizing circuit of valve 30 so that it cannot open. Relay contact 176 also opens and deenergizes relay 174 which closes its contact 178 to permit energization of the main vent valve. The conductor 109 is energized through the relay contact 186 and contact 136 of relay 111. This causes energization of the vent valves 24 and 26 through the closed contact 110 of relay 108 so that the vent valves open. Carbon dioxide valves 37 and 38 are also energized from conductor 109, and open to admit carbon dioxide to both machines through the valves 36 and 36A which remain open since they are not energized at this time. The valves 22 and 22A are energized through conductor 139 by closure of the relay contact 138, and the purity meter valves 50, 50A, 53 and 53A are similarly energized to connect the purity meter sampling lines to the upper parts of the respective machine housings.

Carbon dioxide is thus admitted to both machines with the vents open, and the machines are purged of hydrogen which escapes to the vent line 23. When the carbon dioxide concentration in each machine reaches the desired value, such as 95%, the corresponding pressure switches 62 and 62A close to energize the relays 71 and 72, respectively.

When each of these relays operates, the corresponding valves 36 and 36A are energized in the manner previously explained, to shut off the flow of carbon dioxide to the respective machines. When both relays 71 and 72 have operated, the contacts 183 and 184 are both open and the purge relay 77 is deenergized. This opens the relay contact 186 and deenergizes the relay 111 to open its contact 136 and deenergize conductor 109. This deenergizes the main and restricted vent valves 24 and 26 so that they close. When the relay 71 is energized, while relay 77 is still energized, it also closes a contact 187 which completes an energizing circuit for the relay 143 through contact 188 of relay 77. When relay 72 is energized, it closes a contact 189 to complete a similar energizing circuit for relay 142. Energization of these relays opens their respective contacts 140 and 141 in the energizing circuits of the vent valves 22 and 22A. Thus, as each machine reaches the desired concentration of carbon dioxide, operation of the corresponding relay 71 or 72 causes the vent valve of that machine to be closed and the carbon dioxide is also shut off as described above. When both machines have reached the desired concentration, the main carbon dioxide valves 37 and 38 are closed, and the main vent valves 24 and 26 are closed, in the manner previously described. The vent valves 22 and 22A remain deenergized after relay 77 drops out because conductor 139 is then deenergized.

Thus, if the hydrogen purity falls belows a predetermined minimum safe value, both machines are immediately purged of hydrogen and filled with carbon dioxide to the desired concentration, after which the flow of carbon dioxide is shut off and the vents are closed so that the machines remain filled with carbon dioxide.

If it is then desired to refill the machines with hydrogen after an automatic purge, this is readily done by pressing the reset button 190. If the normal air side seal oil pressure is present, so that the pressure switch contact 10 is closed, closure of the reset button 190 energizes relay 80 which seals itself in through the contact 104 if the purge relay 77 is deenergized. Energization of the relay 80 closes its contacts 105 and 106, and since the relays 71 and 72 are both energized at this time because of the presence of carbon dioxide at the desired concentration in the machines, the operation of filling the machines with hydrogen to the desired purity and pressure will proceed in the manner previously described.

It is believed that the operation of this gas control system will be apparent from the foregoing description. For clarity, however, it may be desirable to summarize the operation, referring particularly to FIG. 1. In filling the machines 1 and 2 with hydrogen, the system first automatically checks the purity meters 45 and 45A for proper operation and calibration by operating them with atmospheric air, and if the purity meters are operating properly, the filling sequence is then permitted to proceed. The carbon dioxide valves 37 and 38 are first opened and the valves 36 and 36A are closed. The valves 29, 29A, 39 and 41 are opened and the vent valves 24 and 26, and 22 and 22A, are opened. The hydrogen feed lines 27 and 27A and the vent lines 21, 21A and 23 are thus purged with carbon dioxide. After a sufficient time delay to permit this purging to be completed, the valves 39 and 41 are closed, and the valves 36 and 36A are opened to permit carbon dioxide to flow through the lines 34 and 34A and into the machines through the bottom gas manifolds 31 and 31A. The air displaced by the carbon dioxide escapes through the top gas manifolds 20 and 20A, and the lines 21 and 21A, through the valves 22 and 22A to the vent. The purity meter sampling lines are connected to the upper part of the housings at this time, and when the concentration of carbon dioxide reaches the desired level in each machine, the corresponding valve 36 or 36A is closed. When both of these valves are closed, the vent valves 22 and 22A are closed and the hydrogen valves 30, 29 and 29A are opened. At the same time, the vent valves 33 and 33A are opened.

Hydrogen then flows into the machines through the lines 27 and 27A and the top gas manifolds 20 and 20A, the carbon dioxide escaping through the bottom gas manifolds 31 and 31A and the vent lines 32 and 32A to the vent. The purity meter sampling lines are connected to the lower part of the housings at this time, and when the gas purity in each machine reaches the desired value, the corresponding valve 29 or 29A is closed. When both these valves have closed, the vent valves 33 and 33A, and 24 and 26, are closed and the hydrogen valves 29 and 29A are reopened. The machines then fill with hydrogen to the desired pressure at which time the main hydrogen feed valve 30 is closed.

If the hydrogen pressure decreases, additional hydrogen is admitted to the machines by opening the main valve 30. If the purity of hydrogen in either machine falls below the desired value, the valve 30 is opened and the valve 29 or 29A of the other machine and the corresponding vent valve 33 or 33A are closed. Hydrogen is thus admitted to the machine in which the purity has fallen, and the restricted vent valve 26 is opened to permit a limited amount of hydrogen to escape from that machine. When the hydrogen purity is restored to the desired value, the vent valves are again closed and the valves 29 and 29A of both machines are opened. When the pressure is restored to the desired value, the main hydrogen valve 30 is again closed. In case the purity of hydrogen in either machine falls to a lower predetermined value, or if the air side seal oil pressure is lost, both machines are immediately purged of hydrogen by admitting carbon dioxide through the valves 37 and 38, and 36 and 36A, the hydrogen valves 29, 29A and 30 being closed and the vent valves 22, 22A, 24 and 26 opened. When the carbon dioxide concentration has reached the desired value, further flow of carbon dioxide is shut off and the vent valves are closed so that the machine remains filled with carbon dioxide and can rapidly be refilled with hydrogen if desired.

It will now be apparent that a gas control system has been provided for dynamoelectric machines which is completely automatic in its operation to purge the machines of air and then to fill them with hydrogen to a desired purity and pressure, and to maintain the purity and pressure during operation. The invention has been described with particular reference to a cross-compound turbine generator unit, but it will be apparent that in its broader aspects it is also applicable to a single machine.

A particular embodiment of the invention has been shown and described for the purpose of illustration, but it is to be understood that various modifications may be made, and that other embodiments of the invention are possible, and the invention includes all such modifications and embodiments within its scope.

I claim as my invention:

1. In combination, a dynamoelectric machine having a substantially gas-tight housing, vent means for venting the housing, means for admitting a purging gas to the housing with the vent means open, means for shutting off the flow of said purging gas when the concentration of purging gas in the housing reaches a predetermined value, means for thereafter admitting hydrogen to the housing, means responsive to hydrogen purity for effecting closing of the vent means when the hydrogen purity in the housing reaches a predetermined value, and pressure responsive means for shutting off the flow of hydrogen when the pressure in the housing reaches a predetermined value.

2. In combination, a dynamoelectric machine having a substantially gas-tight housing, vent means for venting the housing, means for admitting a purging gas to the housing with the vent means open, means for shutting off the flow of said purging gas when the concentration of purging gas in the housing reaches a predetermined value, means for thereafter admitting hydrogen to the housing, means responsive to hydrogen purity for effecting closing of the vent means when the hydrogen purity in the housing reaches a predetermined value, said purity responsive means effecting restricted venting of the housing if the hydrogen purity thereafter falls below said value, and pressure responsive means for shutting off the flow of hydrogen to the housing when the pressure in the housing reaches a predetermined value and for readmitting hydrogen to the housing when the pressure falls below said value.

3. In combination, a dynamoelectric machine having a substantially gas-tight housing, vent means for venting the housing, means for admitting a purging gas to the housing with the vent means open, means for shutting off the flow of said purging gas when the concentration of purging gas in the housing reaches a predetermined value, means for thereafter admitting hydrogen to the housing, means responsive to hydrogen purity for effecting closing of the vent means when the hydrogen purity in the housing reaches a predetermined value, and pressure responsive means for shutting off the flow of hydrogen when the pressure in the housing reaches a predetermined value, said hydrogen purity responsive means being operative to effect opening of the vent means, shutting off the flow of hydrogen, and admission of the purging gas to the housing if the hydrogen purity falls below a predetermined value lower than the first-mentioned predetermined value.

4. In combination, two electric generators adapted for operation together as a unit, e ach of said generators having a substantially gas-tight housing, vent means for venting each of said housings, means for admitting a purging gas to each housing with the vent means open, means for separately shutting off the flow of purging gas to each housing when the concentration of purging gas in the housing reaches a predetermined value, means responsive to the shutting off of purging gas from both housings for admitting hydrogen to both housings, gas purity measuring means for each housing, each of said measuring means effecting closing of the vent means for its housing when the hydrogen purity reaches a predetermined value, means connecting the two housings for operation at the same gas pressure, and pressure responsive means for shutting off the flow of hydrogen to both housings when the gas pressure in the housings reaches a predetermined value.

5. In combination, two electric generators adapted for operation together as a unit, each of said generators having a substantially gas-tight housing, vent means for venting each of said housings, means for admitting a purging gas to each housing with the vent means open, means for separately shutting off the flow of purging gas to each housing when the concentration of purging gas in the housing reaches a predetermined value, means responsive to the shutting off of purging gas from both housings for admitting hydrogen to both housings, gas purity measuring means for each housing, each of said measuring means effecting closing of the vent means for its housing when the hydrogen purity reaches a predetermined value, each of said gas purity measuring means effecting restricted venting of the corresponding housing if the hydrogen purity thereafter falls below said value, means connecting the two housings for operation at the same gas pressure, and pressure responsive means for shutting off the flow of hydrogen to both housings when the gas pressure in the housings reaches a predetermined value, and for readmitting hydrogen when the pressure falls below said value.

6. In combination, a dynamoelectric machine having a substantially gas-tight housing, first value means for admitting a purging gas to the housing, second valve means for admitting hydrogen to the housing, vent means for venting gas from the housing, gas purity measuring means for measuring the purity of gas in the housing, means for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a predetermined value, and means for effecting closing of the second valve means when the pressure of hydrogen in the housing reaches a predetermined value.

7. In combination, a dynamoelectric machine having a substantially gas-tight housing, first valve means for admitting a purging gas to the housing, second valve means for admitting hydrogen to the housing, vent means for venting gas from the housing, gas purity measuring means for measuring the purity of gas in the housing, means for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a predetermined value, means for effecting closing of the second valve means when the hydrogen pressure in the housing reaches a predetermined value and for thereafter effecting opening of the second valve means when the pressure falls below said value, restricted vent means for the housing, and means for effecting opening of said restricted vent means if the purity of hydrogen in the housing falls below a predetermined value and for effecting closing of the restricted vent means when the hydrogen purity again reaches said value.

8. In combination, a dynamoelectric machine having a substantially gas-tight housing, first valve means for admitting a purging gas to the housing, second valve means for admitting hydrogen to the housing, vent means for venting gas from the housing, gas purity measuring means for measuring the purity of gas in the housing, means for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a predetermined value, and means for effecting closing of the second valve means when the pressure of hydrogen in the housing reaches a predetermined value, and means actuated by the gas purity measuring means if the purity of hydrogen in the housing thereafter falls below a lower predetermined value for effecting opening of the first-mentioned vent means, closing of the second valve means and opening of the first valve means.

9. In combination, a dynamoelectric machine having a substantially gas-tight housing, first valve means for admitting a purging gas to the housing, second valve means for admitting hydrogen to the housing, vent means for venting gas from the housing, gas purity measuring means for measuring the purity of gas in the housing, means for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a predetermined value, means for effecting closing of the second valve means when the hydrogen pressure in the housing reaches a predetermined value and for thereafter effecting opening of the second valve means when the pressure falls below said value, restricted vent means for the housing, means for effecting opening of said restricted vent means if the purity of hydrogen in the housing falls below a predetermined value and for effecting closing of the restricted vent means when the hydrogen purity again reaches said value, and means operative after the hydrogen purity has initially reached the predetermined value for effecting opening of the first-mentioned vent means, closing of the second valve means and opening of the first valve means if the hydrogen purity thereafter falls below a lower predetermined value.

10. In combination, two electric generators adapted for operation together as a unit, each of said generators having a substantially gas-tight housing, first valve means for each housing for admitting a purging gas thereto, second valve means for each housing for admitting hydrogen thereto, vent means for each housing, gas purity measuring means for each housing, means for effecting opening of said first valve means and said vent means of both housings, control means actuated by each of said gas purity measuring means for independently effecting closing of said first valve means of the corresponding housing when the purity of purging gas in the housing reaches a predetermined value, means responsive to closing of the first valve means of both housings for effecting admission of hydrogen to both housings through said second valve means, control means actuated by each of said gas purity measuring means for effecting closing of the vent means of the corresponding housing when the hydrogen purity in the housing reaches a predetermined value, means connecting the two housings for operation at the same hydrogen pressure, and pressure responsive means for effecting interruption of the flow of hydrogen to both housings when the hydrogen pressure reaches a predetermined value.

11. In combination, two electric generators adapted for operation together as a unit, each of said generators having a substantially gas-tight housing, first valve means for each housing for admitting a purging gas thereto, second valve means for each housing for admitting hydrogen thereto, vent means for each housing, gas purity measuring means for each housing, means for effecting opening of said first valve means and said vent means of both housings, control means actuated by each of said gas purity measuring means for independently effecting closing of said first valve means of the corresponding housing when the purity of purging gas in the housing reaches a predetermined value, means responsive to closing of the first valve means of both housings for effecting admission of hydrogen to both housings through said second valve means, control means actuated by each of said gas purity measuring means for effecting closing of the vent means of the corresponding housing when the hydrogen purity in the housing reaches a predetermined value, said last-mentioned control means effecting restricted venting of the corresponding housing if the hydrogen purity thereafter falls below said value, means connecting the two housings for operation at the same hydrogen pressure, and pressure responsive means for effecting interruption of the flow of hydrogen to both housings when the hydrogen pressure reaches a predetermined value and for readmitting hydrogen when the pressure falls below said value.

12. In combination, two electric generators adapted for operation together as a unit, each of said generators having a substantially gas-tight housing, first valve means for each housing for admitting a purging gas thereto, second valve means for each housing for admitting hydrogen thereto, vent means for each housing, gas purity measuring means for each housing, means for effecting opening of said first valve means and said vent means of both housings, control means actuated by each of said gas purity measuring means for independently effecting closing of said first valve means of the corresponding housing when the purity of purging gas in the housing reaches a predetermined value, third valve means for admitting hydrogen to both housings through said second valve means, means responsive to closing of the first valve means of both housings for effecting opening of the third valve means, control means actuated by each of said gas purity measuring means for independently effecting closing of the second valve means and vent means of the corresponding housing when the purity of hydrogen therein reaches a predetermined value, means responsive to closing of the second valve means of both housings for effecting reopening of both second valve means, means connecting the two housings for operation at the same hydrogen pressure, and pressure responsive means for effecting closing of the third valve means when the hydrogen pressure reaches a predetermined value.

13. In combination, two electric generators adapted for operation together as a unit, each of said generators having a substantially gas-tight housing, first valve means for each housing for admitting a purging gas thereto, second valve means for each housing for admitting hydrogen thereto, vent means for each housing, gas purity measuring means for each housing, means for effecting opening of said first valve means and said vent means of both housings, control means actuated by each of said gas purity measuring means for independently effecting closing of said first valve means of the corresponding housing when the purity of purging gas in the housing reaches a predetermined value, third valve means for admitting hydrogen to both housings through said second valve means, means responsive to closing of the first valve means of both housings for effecting opening of the third valve means, control means actuated by each of said gas purity measuring means for independently effecting closing of the second valve means and vent means of the corresponding housing when the purity of hydrogen therein reaches a predetermined value, means responsive to closing of the second valve means of both housings for effecting reopening of both second valve means, said last-mentioned control means being operative if the hydrogen purity in either housing thereafter falls below said predetermined value to effect opening of the vent means of that housing and closing of the second valve means of the other housing, means connecting the two housings for operation at the same hydrogen pressure, and pressure responsive means for effecting closing of the third valve means when the hydrogen pressure reaches a predetermined value and opening of the third valve means when the pressure falls below said value.

14. In combination, two electric generators adapted for operation together as a unit, each of said generators having a substantially gas-tight housing, first valve means for each housing for admitting a purging gas thereto, second valve means for each housing for admitting hydrogen thereto, vent means for each housing, gas purity measuring means for each housing, means for effecting opening of said first valve means and said vent means of both housings, control means actuated by each of said gas purity measuring means for independently effecting closing of said first valve means of the corresponding housing when the purity of purging gas in the housing reaches a predetermined value, third valve means for admitting hydrogen to both housings through said second valve means, means responsive to closing of the first valve means of both housings for effecting opening of the third valve means, control means actuated by each of said gas purity measuring means for independently effecting closing of the second valve means and vent means of the corresponding housing when the purity of hydrogen therein reaches a predetermined value, means responsive to closing of the second valve means of both housings for effecting reopening of both second valve means, said last-mentioned control means being operative if the hydrogen purity in either housing thereafter falls below said predetermined value to effect opening of the vent means of that housing and closing of the second valve means of the other housing, means connecting the two housings for operation at the same hydrogen pressure, pressure responsive means for effecting closing of the third valve means when the hydrogen pressure reaches a predetermined value and opening of the third value means when the pressure falls below said value, and means actuated by said gas purity measuring means when the hydrogen purity in either housing falls below a predetermined value less than the first-mentioned value of hydrogen purity for effecting closing of the second and third valve means, opening of the vent means of both housings and opening of the first valve means of both housings.

15. A coolant gas control system for a dynamo-electric machine having a substantially gas-tight housing, said system comprising gas purity measuring means for continuously measuring the purity of gas in the housing, means for checking the operation of said gas purity measuring means, and means controlled by the gas purity measuring means and operable only upon successful operation of said checking means for filling said housing with a purging gas to a predetermined gas purity and thereafter filling the housing with hydrogen to a predetermined purity and pressure and maintaining said hydrogen purity and pressure.

16. In combination, a dynamoelectric machine having a substantially gas-tight housing, first valve means for admitting a purging gas to the housing, second valve means for admitting hydrogen to the housing, vent means for venting gas from the housing, gas purity measuring means for measuring the purity of gas in the housing, means for checking the operation of the gas purity measuring means, means responsive to successful operation of said checking means for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a predetermined value, and means for effecting closing of the second valve means when the pressure of hydrogen in the housing reaches a prdetermined value.

17. In combination, a dynamoelectric machine having a substantially gas-tight housing, first valve means for admitting a purging gas to the housing, second valve means for admitting hydrogen to the housing, vent means for venting gas from the housing, gas purity measuring means for measuring the purity of gas in the housing, means for checking the operation of the gas purity measuring means, means responsive to successful operation of said checking means for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a predetermined value, means for effecting closing of the second valve means when the hydrogen pressure in the housing reaches a predetermined value and for thereafter effecting opening of the second valve means when the pressure falls below said value, restricted vent means for the housing, and means for effecting opening of said restricted vent means if the purity of hydrogen in the housing falls below a predetermined value and for effecting closing of the restricted vent means when the hydrogen purity again reaches said value.

18. A coolant gas control system for a dynamoelectric machine having a substantially gas-tight housing, a shaft, and gland seal means at the points where the shaft passes through the housing, said gland seal means having a first supply of sealing oil on the air side of the seal and a second supply of sealing oil on the gas side of the seal, said gas control system comprising gas purity measuring means for continuously measuring the purity of gas in the housing, means controlled by the gas purity measuring means and operable only if the pressure of said first supply of sealing oil is above a predetermined value for filling said housing with a purging gas to a predetermined gas purity and thereafter filling the housing with hydrogen to a predetermined purity and pressure and maintaining said hydrogen purity and pressure, and means responsive to the pressure of said second supply of sealing oil for maintaining the hydrogen purity at a predetermined lower value if the pressure of the second sealing oil supply is below a predetermined value.

19. In combination, a dynamoelectric machine having a substantially gas-tight housing, a shaft, and gland seal means at the points where the shaft passes through the housing, said gland seal means having a first supply of sealing oil on the air side of the seal and a second supply of sealing oil on the gas side of the seal, first valve means for admitting a purging gas to the housing, second valve means for admitting hydrogen to the housing, vent means for venting gas from the housing, gas purity measuring means for measuring the purity of gas in the housing, means operable only if the pressure of said first supply of sealing oil is above a predetermined value for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a first predetermined value if the pressure of said second supply of sealing oil is below a predetermined value and when the purity of hydrogen in the housing reaches a second higher predetermined value if the pressure of the second sealing oil supply is above said value, and means for effecting closing of the second valve means when the pressure of hydrogen in the housing reaches a predetermined value.

20. In combination, a dynamoelectric machine having a substantially gas-tight housing, a shaft, and gland seal means at the points where the shaft passes through the housing, said gland seal means having a first supply of sealing oil on the air side of the seal and a second supply of sealing oil on the gas side of the seal, first valve means for admitting a purging gas to the housing, second valve means for admitting hydrogen to the housing, vent means for venting gas from the housing, gas purity measuring means for measuring the purity of gas in the housing, means operable only if the pressure of said first supply of sealing oil is above a predetermined value for effecting opening of said first valve means and said vent means, control means actuated by said gas purity measuring means for effecting closing of the first valve means and opening of the second valve means when the purity of purging gas in the housing reaches a predetermined value and for effecting closing of the vent means when the purity of hydrogen in the housing reaches a predetermined value, means for effecting closing of the second valve means when the hydrogen pressure in the housing reaches a predetermined value and for thereafter effecting opening of the second valve means when the pressure falls below said value, restricted vent means for the housing, and means for effecting opening of said restricted vent means if the purity of hydrogen in the housing falls below a predetermined value and for effecting closing of the restricted vent means when the hydrogen purity again reaches said value, and means responsive to the pressure of said second supply of sealing oil for changing said hydrogen purity to a lower value if the second sealing oil supply is below a predetermined pressure.

References Cited by the Examiner

UNITED STATES PATENTS 2,988,656   6/1961   Grobel _____ 310—53

MILTON O. HIRSHFIELD, *Primary Examiner.*

L. L. SMITH, *Assistant Examiner.*